(12) United States Patent
Tanaka

(10) Patent No.: US 11,366,835 B2
(45) Date of Patent: Jun. 21, 2022

(54) INFORMATION PROCESSING DEVICE, NON-TRANSITORY COMPUTER-READABLE STORAGE MEDIUM, AND INFORMATION PROCESSING METHOD

(71) Applicant: Mitsubishi Electric Corporation, Tokyo (JP)

(72) Inventor: Nobuaki Tanaka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 63 days.

(21) Appl. No.: 17/103,494

(22) Filed: Nov. 24, 2020

(65) Prior Publication Data
US 2021/0081438 A1 Mar. 18, 2021

Related U.S. Application Data

(63) Continuation of application No. PCT/JP2018/028584, filed on Jul. 31, 2018.

(51) Int. Cl.
*G06F 16/28* (2019.01)
*G06N 20/00* (2019.01)

(52) U.S. Cl.
CPC ........... *G06F 16/285* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,010,167 B1* | 3/2006 | Ordowski | ............ | G06K 9/6267 |
| | | | | 382/165 |
| 7,308,451 B1* | 12/2007 | Lamping | ................. | G06F 16/35 |
| | | | | 707/999.005 |
| 2007/0265743 A1 | 11/2007 | Kojitani et al. | | |
| 2012/0330957 A1* | 12/2012 | Nagano | ................. | G06F 12/121 |
| | | | | 707/E17.089 |

(Continued)

OTHER PUBLICATIONS

Qi et al., "Hierarchical Diagnosis Network Based on Sparse Deep Neural Networks and Its Application in Bearing Fault Diagnosis", Prognostics and System Health Management Conference (PHM-Harbin), 2017, pp. 1-7.

(Continued)

*Primary Examiner* — Robert W Beausoliel, Jr.
*Assistant Examiner* — Cheryl M Shechtman
(74) *Attorney, Agent, or Firm* — Birch, Stewart, Kolasch & Birch, LLP

(57) ABSTRACT

An information processing device (100) includes a memory and processing circuitry. The memory stores a data set (DG) including multiple items of digital data (DD) and a label set (RG) including multiple labels. Each of the multiple labels are added to each of the multiple items of digital data (DD). The processing circuitry generates a feature vector set (BG) by extracting a predetermined feature from each of the multiple items of digital data (DD) and generating feature vectors indicating the extracted features. The feature vector set includes the feature vectors. The processing circuitry determines homogeneity of the data set (DG) by performing a trial of supervised clustering on the feature vector set (BG) by using the label set (RG) and determining the possibility of the clustering.

17 Claims, 3 Drawing Sheets

(56) References Cited

U.S. PATENT DOCUMENTS

| | | | | |
|---|---|---|---|---|
| 2014/0337269 A1* | 11/2014 | Eads | ............... | G06N 5/02 |
| | | | | 706/46 |
| 2016/0107765 A1* | 4/2016 | Dani | ............... | G05B 23/0251 |
| | | | | 701/29.1 |
| 2017/0017901 A1* | 1/2017 | Firooz | ............... | G06N 20/00 |
| 2021/0374525 A1* | 12/2021 | Bremer | ............... | G06N 3/04 |
| 2022/0004820 A1* | 1/2022 | Meron | ............... | G06K 9/628 |

OTHER PUBLICATIONS

Tatebayashi et al., "Nyumon Taguchi Mesoddo (An Introduction to Taguchi Methods)", JUSE Press. Ltd., 2004, pp. 167-185 (Total No. pp. 14).

Indian Office Action dated Sep. 16, 2021 for Application No. 202047057087 with an English translation.

Meftahi et al., "A New Homogeneity Inter-Clusters Measure in Semi-Supervised Clustering", International Journal of Computer Applications, vol. 66, No. 24, Mar. 2013, pp. 37-45.

Zeidat et al., "Supervised Clustering: Algorithms and Application", Department of Computer Science, University of Houston, May 23, 2006, 35 pages.

German Office Action for German Application No. 112018007776.4, dated Mar. 15, 2021, with English translation.

* cited by examiner

INFORMATION PROCESSING DEVICE, NON-TRANSITORY COMPUTER-READABLE STORAGE MEDIUM, AND INFORMATION PROCESSING METHOD

CROSS-REFERENCE TO RELATED APPLICATION

This application is a continuation application of International Application No. PCT/JP2018/028584 having an international filing date of Jul. 31, 2018.

BACKGROUND OF THE INVENTION

1. Field of the Invention

The present disclosure relates to an information processing device, a non-transitory computer-readable storage medium, and an information processing method.

2. Description of the Related Art

Advances in deep learning and related techniques have led to the popularization of systems capable of performing complex recognition tasks related to images or sounds. In such a system, a latent structure of a large amount of learning data can be automatically found, and this realizes high generalization performance that could not be achieved by the classical methods prior to deep learning.

However, such a system does not function in situations in which a large amount of labeled data is unavailable for learning. In contrast, a situation in which a large amount of learning data is available for various tasks that actually exist is extremely rare. Therefore, in most cases, the reality is that non-classical methods such as deep learning are useless.

For example, methods for automatically diagnosing the soundness of devices on the basis of sounds and vibration generated by the devices have been studied for a long time, and various methods have been developed. For example, the Mahalanobis-Taguchi (MT) method described in Non-Patent Literature 1 is one of the most representative methods. In the MT method, a feature space in which normal samples are distributed is preliminarily learned as a reference space, and at the time of diagnosis, normality or abnormality is determined in accordance with the divergence of an observed feature vector from the reference space.

In classical methods, such as the MT method, appropriate restrictions can be readily applied to the models to be learned by incorporating empirical knowledge in the extraction of features and making assumptions about the distribution of feature vectors. Therefore, such a method does not require the large amount of data required for deep learning.

Non-patent Literature 1: Kazuo Tatebayashi, "nyumon taguchi mesoddo (Introduction to Taguchi Method)," JUSE Press. Ltd., 2004, pp. 167-185.

SUMMARY OF THE INVENTION

However, the classical method has a problem in that, although it requires only a small amount of data for learning, it does not function unless the quality of the data is high. However, in such a field, there are very few techniques that provide the perspective of improving the quality of measured data. In particular, there are almost none general methods that do not require specific knowledge of the task to be performed, and even methods that quantitatively represent the quality of measured data are not well established.

Accordingly, an object of one or more aspects of the present disclosure is to provide a general means for determining the homogeneity of a data set being used.

An information processing device according to an aspect of the present disclosure includes: a memory to store a data set including multiple items of digital data and a label set including multiple labels, each of the multiple labels being added to each of the multiple items of digital data; and processing circuitry to generate a feature vector set by extracting a predetermined feature from each of the multiple items of digital data and generating feature vectors indicating the extracted features, the feature vector set including the feature vectors, and to determine homogeneity of the data set by performing a trial of supervised clustering on the feature vector set by using the label set and determining possibility of the clustering.

A non-transitory computer-readable storage medium according to an aspect of the present disclosure, the medium storing a program that causes a computer to execute processing including: storing a data set including multiple items of digital data and a label set including multiple labels, each of the multiple labels being added to each of the multiple items of digital data; generating a feature vector set by extracting a predetermined feature from each of the multiple items of digital data and generating feature vectors indicating the extracted features, the feature vector set including the feature vectors; and determining homogeneity of the data set by performing a trial of supervised clustering on the feature vector set by using the label set and determining possibility of the clustering.

A method of processing information according to a first aspect of the present disclosure includes: storing a data set including multiple items of digital data and a label set including multiple labels, each of the multiple labels being added to each of the multiple items of digital data; generating a feature vector set by extracting a predetermined feature from each of the multiple items of digital data and generating feature vectors indicating the extracted features, the feature vector set including the feature vectors; and determining homogeneity of the data set by performing a trial of supervised clustering on the feature vector set by using the label set and determining possibility of the clustering.

According to one or more aspects of the present disclosure, a general means can be provided for determining the homogeneity of a data set being used.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

In the following embodiments, a case is assumed where the homogeneity of a data set indicating the vibration of a motor is determined. When multivariate analysis or machine learning is used to determine the soundness of a motor on the basis of the vibration of the motor, the data sets used for the learning must be homogeneous. Here, an information processing device and an information processing method for determining the homogeneity will be described.

Figure 1:
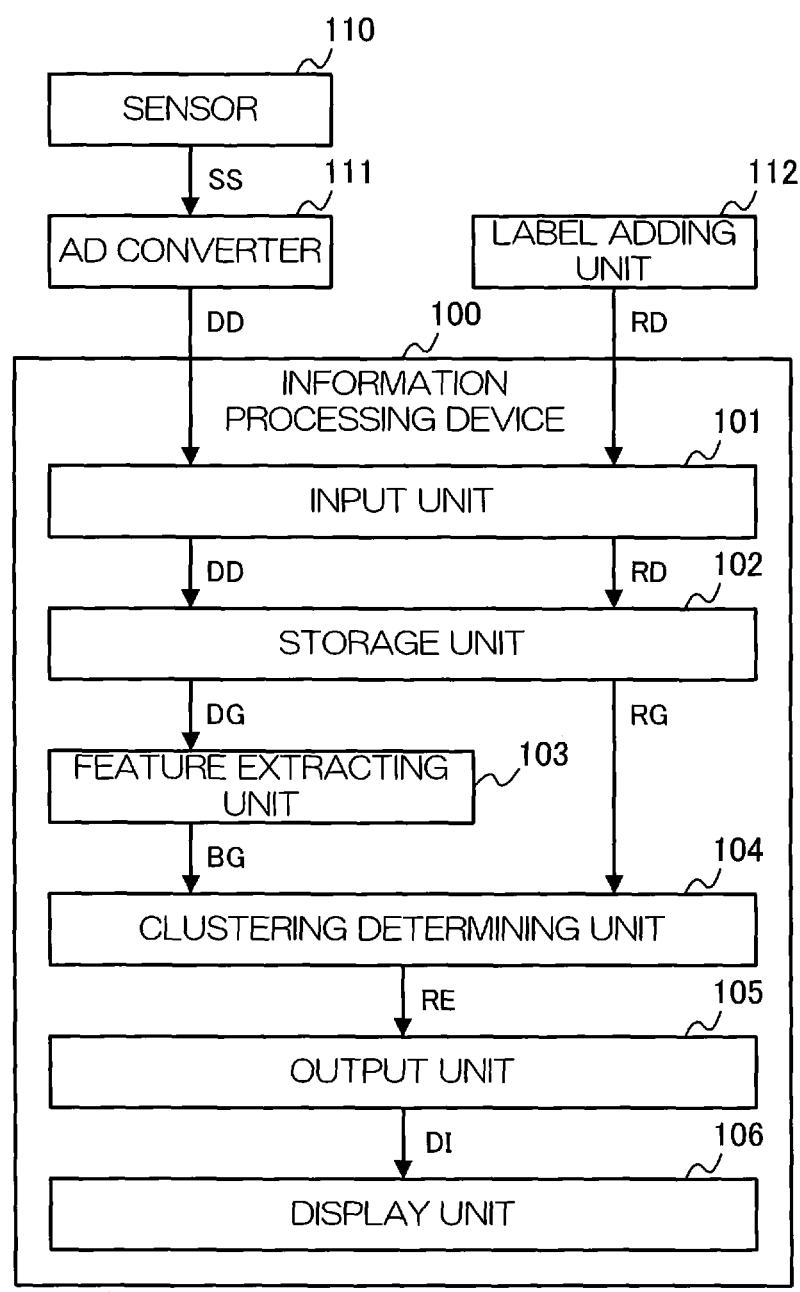
FIG. 1 is a block diagram schematically illustrating the configuration of an information processing device.

FIG. 1 is a block diagram schematically illustrating the configuration of an information processing device 100 according to a first embodiment.

In the first embodiment, the vibration of a target motor is measured by a sensor 110. A measurement signal SS indicating the measurement result by the sensor 110 is converted to digital data DD by an AD converter 111.

A label adding unit 112 adds a corresponding label RD to the digital data DD converted by the AD converter 111. The digital data DD and the label RD are input to the information processing device 100 and processed. Note that, here, the added label RD is expected to be unrelated to the homogeneity of the digital data DD.

The label RD added here is assumed to indicate when the digital data DD was measured, by whom the digital data DD was measured, where the digital data DD was measured, or the like. Such a label RD may be manually input or may be automatically generated by using a calculator having a built-in clock or the like.

The information processing device 100 includes an input unit 101, a storage unit 102, a feature extracting unit 103, a clustering determining unit 104, an output unit 105, and a display unit 106.

The input unit 101 receives input of the digital data DD converted by the AD converter 111 and the label RD added by the label adding unit 112. The input unit 101 then sends the input digital data DD and the label RD to the storage unit 102. Note that, it is assumed that the AD converter 111 and the label adding unit 112 sequentially send out items of digital data DD and labels RD added to the items of digital data DD.

The storage unit 102 stores the sets of digital data DD and labels RD sent from the input unit 101 as a data set DG and a label set RG. In other words, the data set DG includes multiple items of digital data DD, and the label set RG includes multiple labels RD added to the respective items of digital data DD.

The feature extracting unit 103 extracts a predetermined feature from each item of digital data DD included in the data set DG obtained from the storage unit 102 and generates a feature vector set BG that is a set of feature vectors indicating the extracted features. The feature extracting unit 103 then sends the feature vector set BG to the clustering determining unit 104. Examples of methods of extracting features from digital data DD that is vibration data include filter bank analysis, wavelet analysis, linear predictive coding (LPC) analysis, and cepstrum analysis.

The clustering determining unit 104 performs a trial of clustering on the basis of the feature vector set BG obtained from the feature extracting unit 103 and the label set RG obtained from the storage unit 102, determines the possibility of clustering, and determines the homogeneity of the data sets. The clustering determining unit 104 then sends a determination result RE to the output unit 105. Here, for the possibility of clustering, the clustering determining unit 104 determines whether or not clustering can be performed, but, alternatively, for example, the degree to which clustering is successful may be determined.

Here, a trial of supervised clustering is performed by a label RD of who measured the data or the like. For example, a case is considered in which clustering is performed by using a label RD indicating the person who measured the data. Essentially, the information about who measured the vibration of the motor by using the sensor 110 is expected to be unrelated to the homogeneity of the data set DG. Therefore, if it is assumed that the data has high homogeneity, clustering should fail when a trial of clustering is performed by using the label RD indicating the person who measured the vibration of the motor.

Therefore, if clustering by using the label RD indicating the person who measured the vibration of the motor is successful, it can be interpreted that the data set DG has a bias that is different depending on the person who measured the vibration.

Similarly, if clustering by using a label RD indicating the date on which the vibration of the motor was measured is successful, it can be interpreted that the digital data DD is inhomogeneous due to the passage of time.

As described above, the homogeneity of a data set DG can be determined by performing a trial of supervised clustering by using a label RD that is unrelated to the homogeneity of the data set DG. Furthermore, knowing which label RD leads to a failure of clustering can provide clues for identifying the source of the inhomogeneity in the data set DG. Since supervised clustering performed on a small data set usually is robust clustering, it is also possible to handle a task for which collection of a large amount of data is difficult.

For example, the clustering determining unit 104 performs a trial of supervised clustering with the label set RG by using an algorithm such as linear discriminant analysis, a support vector machine, a mixed normal distribution model, or a neural network. Specifically, when linear discriminant analysis is used, the clustering determining unit 104 performs a trial of clustering by calculating a matrix that transforms feature vectors so that the feature vectors of the same cluster can approach each other (variance is small) and the feature vectors of different clusters can be apart from each other (variance is large).

Specifically, the clustering determining unit 104 performs supervised clustering to classify each of the feature vectors included in the feature vector set BG into any one of multiple clusters, applies a parametric distribution to the feature vectors classified into the clusters, and determines the possibility of clustering by using the degree of divergence of the clusters.

For example, the clustering determining unit 104 may apply a normal distribution to multiple feature vectors and measure the degree of divergence in the Mahalanobis distance or the Bhattacharyya distance.

Alternatively, the clustering determining unit 104 may classify multiple feature vectors into multiple clusters by supervised clustering, perform projective conversion on the feature vectors classified into the respective clusters so that each of the clusters can diverge from each other, and determine the possibility of clustering by using the degree of divergence of the clusters.

Here, the clustering determining unit 104 may perform the projective transformation by discriminant analysis or on the basis of a margin maximization criterion.

The output unit 105 outputs the determination result RE obtained from the clustering determining unit 104 to a user. For example, when clustering by a label RD is successful, the output unit 105 causes the display unit 106 to display information indicating that the corresponding data set is not homogeneous.

At this time, the determination result RE output by the clustering determining unit 104 does not necessarily have to be a binary value indicating the homogeneity or inhomogeneity of the data set and may be a continuous value corresponding to the degree to which clustering is successful, or the like. The continuous value is, for example, the distance between different clusters, the accuracy rate of the clustering result, or the like, and such a continuous value can indicate the degree to which clustering is successful. In such a case, the output unit 105 can inform the user about the level of homogeneity of the data set in accordance with the value output by the clustering determining unit 104.

The output unit 105 can prompt the user to improve the data collection process by causing the display unit 106 to display, depending on a label by which clustering has been successful, the cause of the inhomogeneity of a data set DG. For example, when clustering by a label indicating who measured the data is successful, the output unit 105 generates a display image DI indicating that the measurement results of the data vary depending on the person and causes the display unit 106 to display the display image DI.

The display unit 106 displays various display images DI in accordance with instructions from the output unit 105.

Figure 2A:
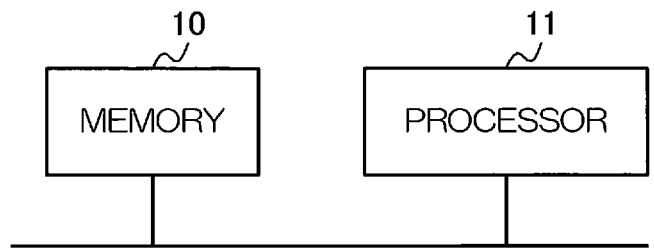
FIGS. 2A and 2B are block diagrams illustrating hardware configuration examples.

A portion or the entirety of the feature extracting unit 103, the clustering determining unit 104, and the output unit 105 described above can be implemented by, for example, a memory 10 and a processor 11, such as a central processing unit (CPU), that executes the programs stored in the memory 10, as illustrated in FIG. 2A. Such programs may be provided to a computer via a network or may be recorded on a recording medium and provided to a computer. That is, such programs may be provided as, for example, program products.

Figure 2B:
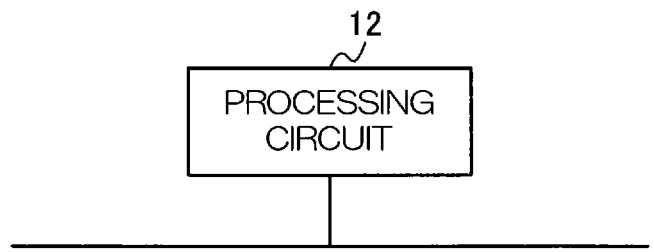

A portion or the entirety of the feature extracting unit 103, the clustering determining unit 104, and the output unit 105, for example, can be implemented by a processing circuit 12, such as a single circuit, a composite circuit, a programmed processor, a parallel programmed processor, an application-specific integrated circuit (ASIC), or a field programmable gate array (FPGA), as illustrated in FIG. 2B.

Note that the input unit 101 can be realized by an interface for inputting data; the storage unit 102 can be realized by a storage device, such as a memory or a hard disk drive; and the display unit 106 can be realized by a display.

In other words, the feature extracting unit 103, the clustering determining unit 104, and the output unit 105 described above can be implemented by processing circuitry.

Figure 3:
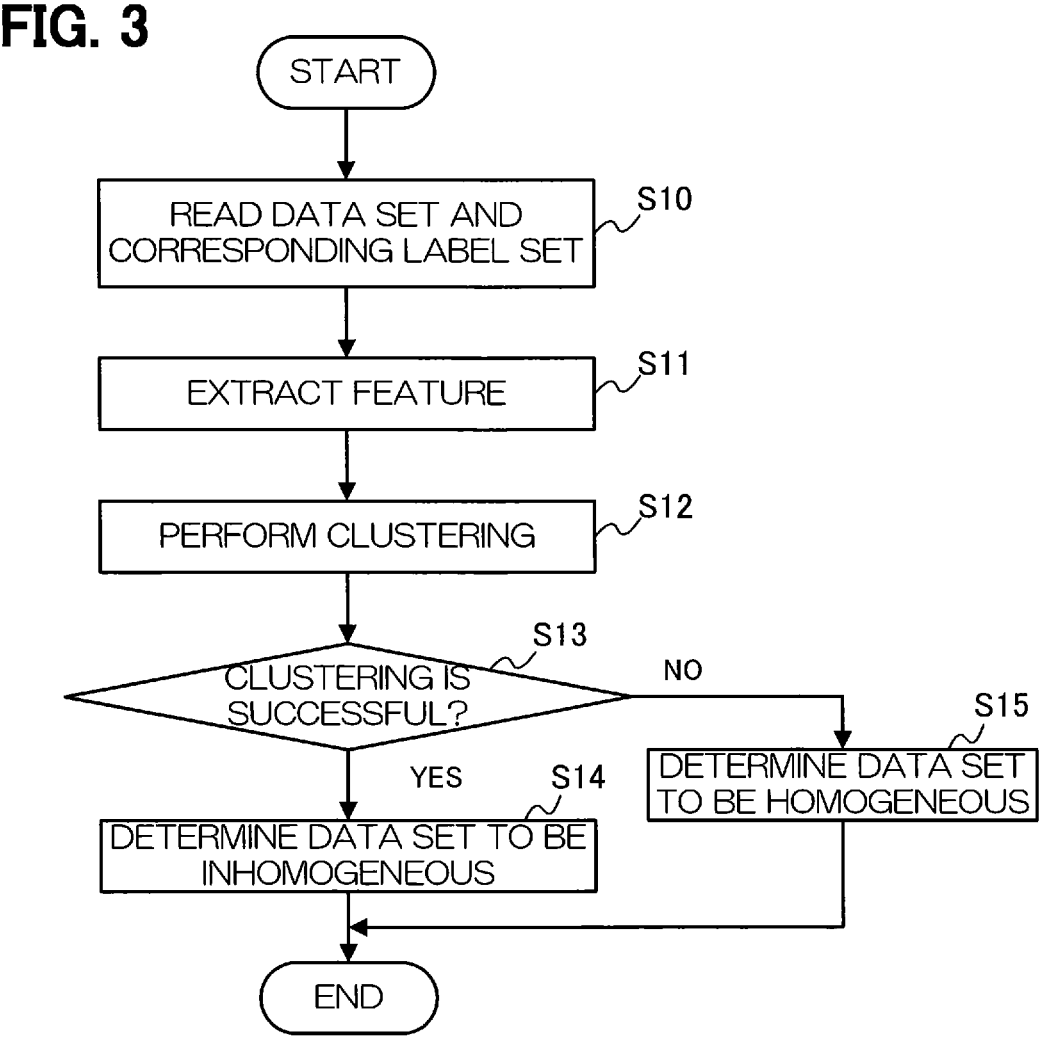
FIG. 3 is a flowchart illustrating a first operation example of an information processing device.

FIG. 3 is a flowchart illustrating a first operation example of the information processing device 100.

FIG. 3 illustrates a case in which clustering is performed by using one type of label set RG and the homogeneity of a data set DG is determined.

First, the feature extracting unit 103 reads a data set DG from the storage unit 102, and the clustering determining unit 104 reads a label set RG from the storage unit 102 (step S10).

The feature extracting unit 103 extracts a feature from each item of digital data DD included in the data set DG and generates a feature vector set BG that is a set of feature vectors indicating the extracted features (step S11). The generated feature vector set BG is sent to the clustering determining unit 104.

The clustering determining unit 104 performs a trial of clustering on the basis of the feature vector set BG obtained from the feature extracting unit 103 and the label set RG obtained from the storage unit 102 (step S12).

The clustering determining unit 104 then determines the possibility of clustering (step S13). Here, it is assumed that whether or not the clustering is successful is determined as the possibility of clustering. If the clustering is successful (Yes in step S13), the process proceeds to step S14; and if the clustering fails (No in step S13), the process proceeds to step S15.

In step S14, the clustering determining unit 104 determines that the data set DG read from the storage unit 102 is inhomogeneous and sends a corresponding determination result RE to the output unit 105. The output unit 105 generates a display image DI indicating the determination result RE and causes the display unit 106 to display the display image DI.

In step S15, the clustering determining unit 104 determines that the data set DG read from the storage unit 102 is homogeneous and sends a corresponding determination result RE to the output unit 105. The output unit 105 generates a display image DI indicating the determination result RE and causes the display unit 106 to display the display image DI.

Note that, in step S13 in FIG. 3, the clustering determining unit 104 determines whether or not the clustering is successful to determine the possibility of clustering, but the embodiment is not limited to such an example. For example, if the clustering determining unit 104 calculates the degree to which clustering is successful in step S12, the clustering determining unit 104 compares the calculated degree with a predetermined threshold in step S13; if the possibility of clustering is higher than or equal to the predetermined possibility and thus it is determined that the possibility of clustering is high, the process proceeds to step S14, and if the possibility of clustering is lower the predetermined possibility and thus it is determined that the possibility of clustering is low, the process proceeds to step S15.

If the clustering determining unit 104 calculates the degree to which clustering is successful, the clustering determining unit 104 may skip the processes in steps S13 to S15 illustrated in FIG. 3 and cause the display unit 106 to display, via the output unit 105, the degree of homogeneity of the data set DG in accordance with the calculated degree. In such a case, the higher the degree to which clustering is successful is, the lower the homogeneity of the data set DG is.

Figure 4:
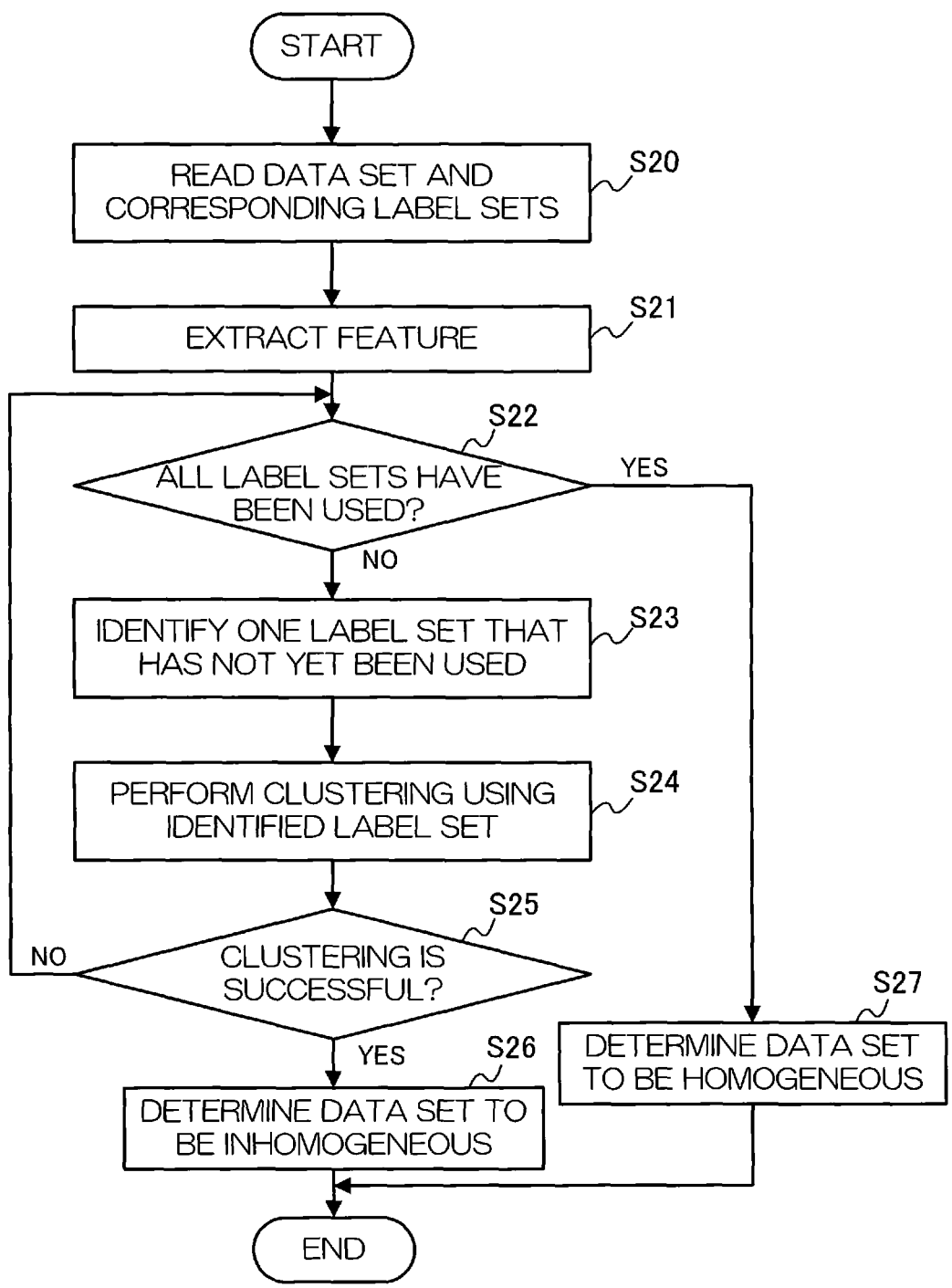
FIG. 4 is a flowchart illustrating a second operation example of an information processing device.

FIG. 4 is a flowchart illustrating a second operation example of the information processing device 100.

FIG. 4 illustrates a case in which, when multiple types of label sets RG exist, clustering is performed by using the multiple label sets RG and the homogeneity of the data set DG is determined.

First, the feature extracting unit 103 reads a data set DG from the storage unit 102, and the clustering determining unit 104 reads multiple label sets RG from the storage unit 102 (step S20).

The feature extracting unit 103 extracts a feature from each item of digital data DD included in the data set DG and generates a feature vector set BG that is a set of feature vectors indicating the extracted features (step S21). The generated feature vector set BG is sent to the clustering determining unit 104.

The clustering determining unit 104 determines whether or not all label sets RG obtained from the storage unit 102 have been used for the determination of the possibility of clustering (step S22). If there is a label set RG that has not yet been used (No in step S22), the process proceeds to step S23; and if all label sets RG have been used (Yes in step S22), the process proceeds to step S27.

In step S23, the clustering determining unit 104 specifies one label set RG that has not yet been used for the determination of the possibility of clustering out of the multiple label sets RG obtained from the storage unit 102.

The clustering determining unit 104 then performs a trial of clustering on the basis of the feature vector set BG obtained from the feature extracting unit 103 and the label set RG specified in step S23 (step S24).

The clustering determining unit 104 then determines the possibility of clustering (step S25). If the clustering is successful (Yes in step S25), the process proceeds to step S26; and if the clustering fails (No in step S25), the process returns to step S22.

In step S26, the clustering determining unit 104 determines that the data set DG read from the storage unit 102 is inhomogeneous and sends a corresponding determination result RE to the output unit 105. The output unit 105 generates a display image DI indicating the determination result RE and causes the display unit 106 to display the display image DI.

In step S27, the clustering determining unit 104 determines that the data set DG read from the storage unit 102 is homogeneous and sends a corresponding determination result RE to the output unit 105. The output unit 105 generates a display image DI indicating the determination result RE and causes the display unit 106 to display the display image DI.

Note that, in step S25 in FIG. 4, the clustering determining unit 104 determines whether or not the clustering is successful to determine the possibility of clustering, but the embodiment is not limited to such an example. For example, if the clustering determining unit 104 calculates the degree to which clustering is successful in step S24, the clustering determining unit 104 compares the calculated degree with a predetermined threshold in step S25; if the possibility of clustering is higher than or equal to the predetermined possibility and thus it is determined that the possibility of clustering is high, the process proceeds to step S26, and if the possibility of clustering is lower the predetermined possibility and thus it is determined that the possibility of clustering is low, the process proceeds to step S27.

If the clustering determining unit 104 calculates the degree to which clustering is successful, the clustering determining unit 104 may skip the processes in steps S22 and S25 to S27 illustrated in FIG. 4, calculate the degree to which clustering is successful for all label sets RG, and cause the display unit 106 to display, via the output unit 105, the degree of homogeneity of the data set DG for each type of label set RG in accordance with the calculated degree. In such a case, the higher the degree to which clustering is successful is, the lower the homogeneity of the data set DG is.

As described above, by performing a trial of supervised clustering for the data set DG on the basis of the label sets RG added to the data set DG and determining the possibility of clustering, the homogeneity of the data set DG can be accurately determined without specific knowledge of the task to be performed, even when the data set DG is small.

Here, by using a label RD indicating a content unrelated to the homogeneity of the digital data DD, it can be determined that the data set DG is homogeneous when the possibility of clustering is low.

By further providing the display unit 106 for displaying a display image DI indicating a determination result RE of the clustering determining unit 104, the determination result RE can be transmitted to the user.

By defining the possibility of clustering as whether or not clustering is successful, it can be readily determined whether or not the data set DG is homogeneous.

By defining the possibility of clustering as the degree to which clustering is successful, it can be readily determined whether or not the data set DG is homogeneous, and the homogeneity of the data set DG can be indicated as the degree of homogeneity.

Note that, by applying a parametric distribution to multiple feature vectors classified into multiple clusters by clustering and determining the possibility of clustering on the basis of the degree of divergence of the clusters, the amount of calculation can be reduced in comparison to when the feature vector set BG is directly handled, and this enables high-speed data processing.

When a normal distribution is used as the above-mentioned parametric distribution, the numerical calculation related to the estimation of the normal distribution is implemented in many numerical calculation libraries that handle multivariate analysis and the like, and is easy to incorporate; therefore, the cost for the implementation of the information processing device 100 can be reduced.

By using a normal distribution as the above-mentioned parametric distribution and measuring the degree of divergence of the clusters by the Mahalanobis distance, a highly accurate degree of divergence in consideration of the shape of the distribution can be obtained, and the accuracy of the determination of homogeneity can be improved. Since the method of calculating the Mahalanobis distance is implemented in many numerical calculation libraries as in the numerical calculation related to the normal distribution, the cost for the implementation of the data processing device can be reduced.

When the Bhattacharyya distance is used as the degree of divergence of the normal distribution, the difference in the shape of the clusters is taken into consideration, unlike the Mahalanobis distance, which assumes the same distribution shape when the degree of divergence of the clusters is measured, and thus, the determination accuracy can be further improved.

Since the above-described method basically assumes that the distribution of the data set is a normal distribution, if this is not the case, the determination accuracy may deteriorate. Therefore, by performing projective transformation on feature vectors belonging to each of the clusters so that the clusters can diverge from each other and by determining the possibility of clustering on the basis of the degree of divergence of each cluster after the transformation, high determination accuracy can be realized even when the distribution of the data set DG is not a normal distribution.

At this time, the projective transformation can be generated by discriminant analysis. In discriminant analysis, calculation can be performed at high speed even when the data to be handled is large, and thus, the time required for data processing can be reduced.

When the projective transformation is generated on the basis of a margin maximization criterion, a robust determination result can be obtained even with a small amount of data.

DESCRIPTION OF REFERENCE CHARACTERS

100 information processing device; 101 input unit; 102 storage unit; 103 feature extracting unit; 104 clustering determining unit; 105 output unit; 106 display unit; 110 sensor; 111 AD converter; 112 label adding unit.

What is claimed is:

1. An information processing device comprising:
    a memory to store a data set including multiple items of digital data and a label set including multiple labels, each of the multiple labels being added to each of the multiple items of digital data; and
    processing circuitry
    to generate a feature vector set by extracting a predetermined feature from each of the multiple items of digital data and generating feature vectors indicating the extracted features, the feature vector set including the feature vectors, and
    to determine homogeneity of the data set by performing a trial of supervised clustering on the feature vector set by using the label set and determining possibility of the clustering.

2. The information processing device according to claim 1, wherein the label indicates a content unrelated to the homogeneity of the digital data.

3. The information processing device according to claim 1, further comprising:
    a display to display a determination result of the processing circuitry.

4. The information processing device according to claim 1, wherein the possibility of the clustering defines whether or not the clustering is successful.

5. The information processing device according to claim 4, wherein, when the processing circuitry determines that clustering is successful, the processing circuitry determines that the data set is inhomogeneous, and when the processing circuitry is determined that clustering is not successful, the processing circuitry determines that the data set is homogeneous.

6. The information processing device according to claim 1, wherein the possibility of the clustering is a degree to which clustering is successful.

7. The information processing device according to claim 6, wherein, when the processing circuitry determines that the possibility of the clustering is high by comparing the degree with a predetermined threshold, the processing circuitry determines that the data set is inhomogeneous, and when the processing circuitry determines that the possibility of the clustering is low, the processing circuitry determines that the data set is homogeneous.

8. The information processing device according to claim 6, wherein the processing circuitry determines that the higher the degree is, the lower the homogeneity is.

9. The information processing device according to claim 1, wherein the processing circuitry classifies each of the feature vectors into any one of multiple clusters by the clustering, applies a parametric distribution to the feature vectors, and determines the possibility of the clustering by using a degree of divergence of the multiple clusters.

10. The information processing device according to claim 9, wherein the parametric distribution is a normal distribution.

11. The information processing device according to claim 9, wherein the processing circuitry measures the degree of divergence by Mahalanobis distance.

12. The information processing device according to claim 9, wherein the processing circuitry measures the degree of divergence by Bhattacharyya distance.

13. The information processing device according to claim 1, wherein the processing circuitry classifies each of the feature vectors into any one of multiple clusters by the clustering, performs projective transformation on the feature vectors such that each of the multiple clusters diverges from each other, and determines the possibility of the clustering by using the degree of divergence of the multiple clusters.

14. The information processing device according to claim 13, wherein the processing circuitry performs the projective transformation by determination analysis.

15. The information processing device according to claim 13, wherein the processing circuitry performs the projective transformation based on a margin maximization criterion.

16. A non-transitory computer-readable storage medium storing a program that causes a computer to execute processing comprising:
    storing a data set including multiple items of digital data and a label set including multiple labels, each of the multiple labels being added to each of the multiple items of digital data;
    generating a feature vector set by extracting a predetermined feature from each of the multiple items of digital data and generating feature vectors indicating the extracted features, the feature vector set including the feature vectors; and
    determining homogeneity of the data set by performing a trial of supervised clustering on the feature vector set by using the label set and determining possibility of the clustering.

17. A method of processing information comprising:
    storing a data set including multiple items of digital data and a label set including multiple labels, each of the multiple labels being added to each of the multiple items of digital data;
    generating a feature vector set by extracting a predetermined feature from each of the multiple items of digital data and generating feature vectors indicating the extracted features, the feature vector set including the feature vectors; and
    determining homogeneity of the data set by performing a trial of supervised clustering on the feature vector set by using the label set and determining possibility of the clustering.

* * * * *